US010642675B2

(12) United States Patent
Williamson et al.

(10) Patent No.: US 10,642,675 B2

(45) **Date of Patent: *May 5, 2020**

(54) DYNAMICALLY CONTROLLING RUNTIME SYSTEM LOGGING BASED ON END-USER REVIEWS

(71) Applicant: INTERNATIONAL BUSINESS MACHINES CORPORATION, Armonk, NY (US)

(72) Inventors: Leigh Williamson, Austin, TX (US); Shinoj Zacharias, Bangalaore (IN); Roger Snook, Charles Town, WV (US); Vijay Ekambaram, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,147

(22) Filed: Jul. 17, 2019

(65) Prior Publication Data

US 2019/0377629 A1 Dec. 12, 2019

Related U.S. Application Data

(63) Continuation of application No. 16/004,824, filed on Jun. 11, 2018.

(51) Int. Cl.

| | |
|---|---|
| ***G06F 9/44*** | (2018.01) |
| ***G06F 11/07*** | (2006.01) |
| ***G06F 11/36*** | (2006.01) |
| ***G06F 11/34*** | (2006.01) |

(52) U.S. Cl.

CPC ...... *G06F 11/0781* (2013.01); *G06F 11/3476* (2013.01); *G06F 11/366* (2013.01); *G06F 11/3612* (2013.01)

(58) Field of Classification Search

CPC ............. G06F 11/0781; G06F 11/3476; G06F 11/366; G06F 11/3612

USPC ............................................. 717/127; 714/48

See application file for complete search history.

(56) References Cited

U.S. PATENT DOCUMENTS

| | | | | |
|---|---|---|---|---|
| 7,506,314 | B2 | 3/2009 | Kollmann | |
| 7,676,699 | B2 * | 3/2010 | Deily | G06F 11/3476 714/39 |
| 8,359,581 | B2 * | 1/2013 | Ortiz | G06F 11/3688 714/25 |

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Anna C Deng

(74) *Attorney, Agent, or Firm* — Michael A. Petrocelli, Esq.; Bianche E. Schiller, Esq.; Heslin Rothenberg Farley & Mesiti P.C.

(57) ABSTRACT

Runtime system statistics logging is dynamically controlled at code and application levels, based on user reviews. Logging of specific code components in specific application instances, identified based on user reviews, is automatically turned on, based on the user reviews indicating defects. Logging for other components or application instances, however, remains off or is automatically turned off.

8 Claims, 8 Drawing Sheets

(56) References Cited

U.S. PATENT DOCUMENTS

| | | | | |
|---|---|---|---|---|
| 9,311,664 | B2 | 4/2016 | Bulumulla et al. | |
| 9,459,990 | B2 | 10/2016 | Ligman | |
| 2016/0283365 | A1* | 9/2016 | Brealey | G06F 11/3692 |
| 2017/0132110 | A1* | 5/2017 | Ekambaram | G06F 11/3419 |
| 2018/0121317 | A1 | 5/2018 | Ekambaram et al. | |
| 2018/0121318 | A1* | 5/2018 | Ekambaram | G06F 11/366 |

OTHER PUBLICATIONS

Gomez, Maria et al., "App Store 2.0: From Crowd Information to Actionable Feedback in Mobile Ecosystems," IEEE Software-Theme Issue on Crowdsourcing for Software Engineering, Mar. 2017, pp. 1-6 (+ cover).

Ravindranath, Lenin et al., "Automatic and Scalable Fault Detection for Mobile Applications," Proceedings of the 12th Annual International Conference on Mobile Systems, Applications and Services, Jun. 2014, pp. 190-203.

Moran, Kevin et al., "Automatically Discovering, Reporting and Reproducing Android Application Crashes," 2016 IEEE International Conference on Software Testing, Verification and Validation (ICST), Jun. 2017, pp. 1-12.

Khalid, Mubasher, "A Case of Mobile App Reviews as a Crowdsource," I.J. Information Engineering and Electronic Business, Sep. 2015, pp. 39-47.

Gomez, Maria et al., "When App Stores Listen to the Crowd to Fight Bugs in the Wild," 37th International Conference on Software Engineering, May 2015, pp. 1-4.

Instabug, "In-App Feedback and Bug Reporting for Mobile Apps," https://instabug.com/, downloaded from internet Jun. 2018, pp. 1-11.

Gomez, Maria et al., Reproducing Context-sensitive Crashes of Mobile Apps Using Crowdsourced Monitoring, 2016 IEEE/ACM International Conference on Mobile Software Engineering and Systems, Mar. 2016, pp. 1-12 (+ cover).

Williamson, Leigh et al., "Dynamically Controlling Runtime System Logging Based on End-User Reviews," U.S. Appl. No. 16/004,824, filed Jun. 11, 2018, pp. 1-37.

List of IBM Patents or Patent Applications Treated as Related, dated Jul. 25, 2019, pp. 1-2.

* cited by examiner

DYNAMICALLY CONTROLLING RUNTIME SYSTEM LOGGING BASED ON END-USER REVIEWS

This application is a continuation of co-pending U.S. patent application Ser. No. 16/004,824, entitled "DYNAMICALLY CONTROLLING RUNTIME SYSTEM LOGGING BASED ON END-USER REVIEWS," filed Jun. 11, 2018, which is hereby incorporated herein by reference in its entirety.

BACKGROUND

One or more aspects relate, in general, to runtime statistics of applications executing on devices, and in particular, to performing logging associated with the applications to collect the runtime statistics.

Applications (also referred to as application programs or programs) may be used to carry out a variety of functions. Runtime statistics relating to execution of the applications are collected for monitoring and troubleshooting purposes. An application may log and push all runtime statistics, such as those with respect to the application, device on which it executes, stack trace, etc. to a server for detailed root-cause analysis.

SUMMARY

Shortcomings of the prior art are overcome and additional advantages are provided through the provision of a computer-implemented method of dynamically controlling logging within a computing environment. The computer-implemented method includes collecting one or more user reviews regarding an application executing on a device. The one or more user reviews are analyzed to determine whether there are one or more negative reviews regarding the application. Based on the analyzing indicating there are one or more negative reviews, a determination is made of one or more code components of the application having one or more defects. Logging is automatically initiated, during runtime, for the one or more code components determined to have the one or more defects to provide one or more logs. The automatically initiating logging is selective for the one or more code components of the application in that logging is not initiated for one or more other components of the application. The one or more logs are used to perform an action.

Computer program products and systems relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1A:
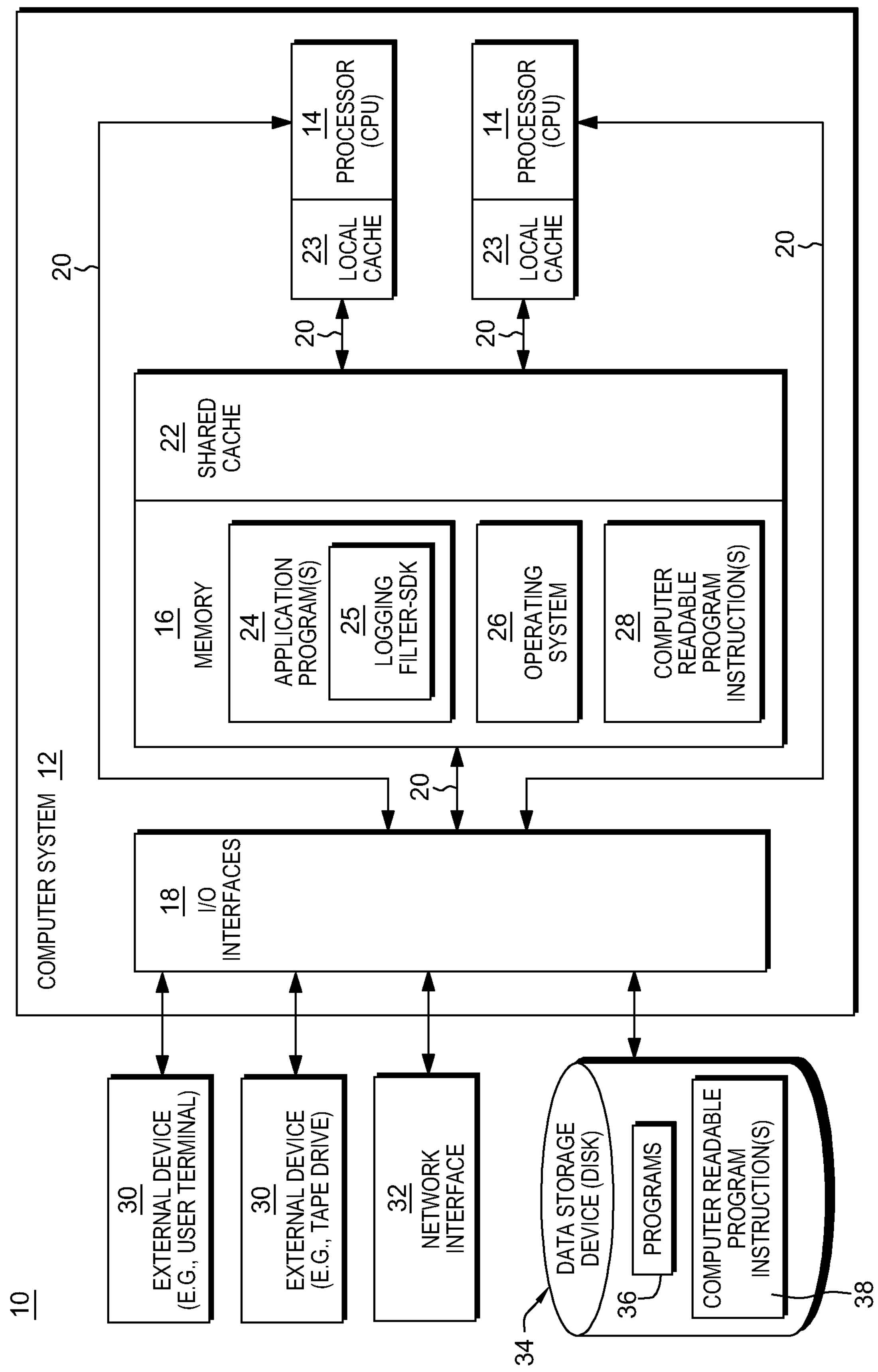
FIG. 1A depicts one example of a computing environment to incorporate and use one or more aspects of the present invention.

In accordance with an aspect of the present invention, a capability is provided to dynamically control the logging of runtime system statistics of applications (apps) executing on a device, such as a mobile device (e.g., mobile phone), laptop computer, desktop computer, tablet, etc. An application may include a collection of programming code or other computing instructions for implementing a specific task or operation. For instance, the application program may include accounting software, billing management software, supply chain management software, enterprise asset management or resource planning software, database management software, or other types of software, such as weather forecast software, mapping software, etc. The types of applications that could be offered is unlimited. An application program may be distributed through an application store (also referred to as an app-store), such as an online marketplace through which users can purchase applications and post reviews for the applications. Reviews posted for an application program on an app-store may include information regarding defects of the application. These defects may include errors, glitches, performance issues, malfunctions, irregularities or other concerns that users have encountered while using the application program.

In accordance with an aspect of the present invention, the user reviews are used to identify one or more components within an application program that are considered to have a defect. As examples, a code component may include a segment, block, lines, chunks or other portions of programming code of an application program. In one example, a code component may include the programming code located between, e.g., lines 37 and 84 of a source code document. In one or more embodiments, a set of code components may include a set of computer instructions configured to provide a particular function or group of related functions (e.g., distributed segments of code that may be related to implementation of the same function). In certain embodiments, code components may include one or more classes (e.g., extensible program-code templates providing initial values for states or behaviors), methods (e.g., procedure associated with a data object), or features (e.g., functions or operations). Other types of code components are also possible.

In one aspect, a capability is provided to dynamically control, based on user reviews, runtime system statistics logging at code and application (app) levels, such that logging for selected code components is automatically turned on and for other components it remains off or is automatically turned off. By selectively controlling the runtime logging dynamically, central processing unit (CPU)/network and memory overhead typically associated with logging all details and pushing all the details to a server are reduced, since there is a reduction in data. As used herein, at code level refers to a part or a component of the code for which details are to be logged; and at application (app) level refers to an instance of the application for which logging is to be performed. Not all applications or even all applications including code components determined to be defective have to log data. It is possible that some application instances that include those code components perform properly. For instance, for an app that relates to updating a User Profile, the code component that performs the update may work properly for first names up to a certain number of characters (e.g., 8), but not for first names exceeding the certain number of characters. Thus, the app may work for some, but not others. Therefore, in accordance with one or more aspects, the one or more particular application instances considered to be having problems, based on the user reviews of the users using those instances, are to log the data.

In accordance with an aspect of the present invention, a capability is provided to determine when to dynamically adjust (e.g., turn on/off) application logging (i.e., which application instance) and where in the application logic to make those fine-grained adjustments. In one embodiment, the runtime systems statistics logging is automatically turned on/off in an application based on one or more defects reported by end-user reviews in, for instance, an application store.

One example of a computing environment to include one or more aspects of the present invention is described with reference to FIGS. 1A-1B. It is to be understood that the computing environment may include one or more components, subsystems, etc. that are not used in one or more embodiments of aspects of the present invention. Likewise, the computing environment may include additional and/or other components to be used in one or more aspects of the present invention.

Referring to FIG. 1A, a computing environment 10 includes, for instance, a computer system 12 shown, e.g., in the form of a general-purpose computing device. Computer system 12 may be any type of computing device, including but not limited to, a mobile device (e.g., a mobile phone), a laptop computer, a desktop computer, a tablet, etc. Many examples exist.

Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24 and an operating system 26. In one example, one or more of the applications are configured to include a logging filter-SDK (Software Development Kit) component 25, used as described herein. Moreover, in one example, memory 16 may include one or more computer readable program instructions 28. Computer readable program instructions 28 may be configured to carry out functions of embodiments of aspects of the invention.

Computer system 12 may also communicate via, e.g., I/O interfaces 18 with one or more external devices 30, one or more network interfaces 32, and/or one or more data storage devices 34. Example external devices include a user terminal, a tape drive, a pointing device, a display, etc. Network interface 32 enables computer system 12 to communicate with one or more networks, such as a local area network (LAN), a general wide area network (WAN), and/or a public network (e.g., the Internet), providing communication with other computing devices or systems.

Data storage device 34 may store one or more programs 36, one or more computer readable program instructions 38, and/or data, etc. The computer readable program instructions may be configured to carry out functions of embodiments of aspects of the invention.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 may be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 14, may execute one or more components to perform one or more aspects of the present invention. These components may be stored in memory, including main memory (e.g., memory 16) and/or one or more caches (e.g., shared cache 22, local cache 23) and/or external storage (e.g., device 34), and may be executed by one or more processors (e.g., processor 14).

Figure 1B:
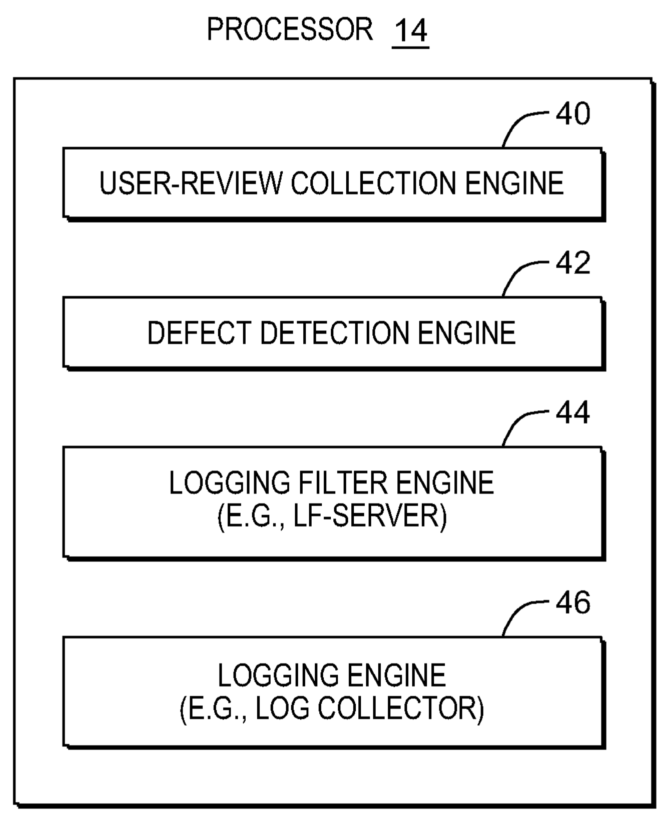
FIG. 1B depicts further details of a processor of FIG. 1A, in accordance with one or more aspects of the present invention.

In one example, referring to FIG. 1B, the components may include a user-review collection engine 40 configured to collect user-reviews of applications; defect detection engine 42 configured to identify defects in applications based on the user-reviews; logging filter engine 44 configured to automatically initiate the turning on/off of logging; and a logging engine 46 configured for collecting and/or analyzing logging events. Additional and/or other components may also be used.

Figure 2:
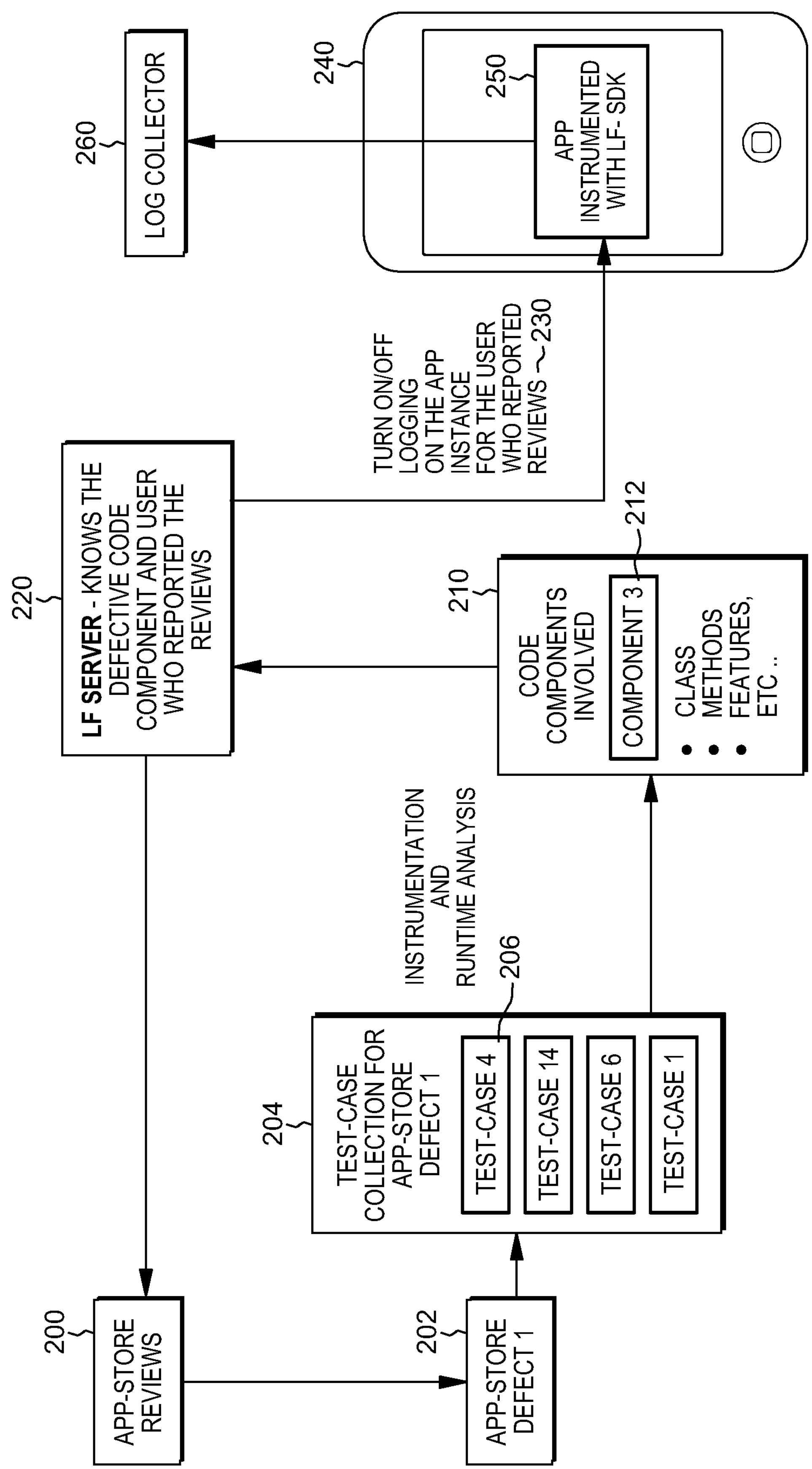
FIG. 2 depicts one embodiment of performing automatic selective logging, in accordance with one or more aspects of the present invention.

One embodiment of selective logging, which includes automatically turning on/off runtime system statistics logging in an application based on defects reported by an end user, is described with reference to FIG. 2. This logic may be performed by a processor, such as processor 14 running on a device, such as a mobile device, a computer or other such device. In one example, the logic may be performed by engines 40-46 (FIG. 1B) and/or one or more other components executing on processor 14 or remote therefrom. In one example, the application and the engines/components may be executing on the same device (e.g., mobile device, laptop, desktop, etc.). In another example, the application and components (e.g., engines 40-46) may be executed on different devices. For instance, the application may execute on a device, such as a mobile phone, and engines 40-46 may be implemented on one or more other processors apart from the device, but coupled thereto. Engines 40-46 may be implemented in a cloud environment. Many examples are possible.

Initially, user reviews 200 for applications are collected from one or more application stores. For instance, user reviews for an I-phone app may be collected from an Apple app store; user reviews for an Android phone app may be collected from Android app stores, etc. Many such examples exist. These user reviews are collected by, e.g., a processor, such as processor 14, and in one example, by a user-review collection engine, such as user-review collection engine 40. Based on these reviews, a defect 202 is determined by, for instance, a defect detection engine, such as defect detection engine 42. This defect may be any type of indication that an app is not performing as designed. Based on the defect, a test case collection 204 is identified. For instance, users (e.g., non-developer users) may post reviews for an application program on an app-store that distributes the application program. In embodiments, the reviews may describe errors, malfunctions, glitches or other irregularities that users have encountered while using the application program.

For instance, a user may post a review describing a defect 202 (Defect 1), in which a weather forecast application does not display up-to-date weather information. Based on defect 202, a test case collection 204 may be identified. Test case collection 204 may include a set of test cases that describe development test environments in which defects or errors similar to defect 202 arose. For instance, test case collection 202 may include a Test-case 4 (206) that describes an error in which the weather forecast application did not refresh when a location registered for a user and a user profile did not match the current location of the user (e.g., as detected by global positioning techniques). Other types of correlations between the defect data and the set of test case data are also possible (see, e.g., Test-cases 14, 6 and 1).

Test case collection 204 may be used to determine one or more code components 210 of an application that correspond to defect 202. In one example, one or more test cases of test case collection 204 may indicate a particular code component. For instance, a test case may reference a code component that was tested as part of a development software testing process. In certain embodiments, the test cases may include executable program code configured to run code components for testing. For instance, defect 202 may relate to a defect in which a "music app plays tracks in playlist order even when shuffle is pressed." A test case collection (e.g., collection 204) that includes test cases that relate to defect 202 may be identified (e.g., test cases that relate to playlist order, the shuffle feature, etc.). In embodiments, Test-case 4 (206) may be executed, and instrumentation techniques may be used to record which code components are executed during test-case playback. For instance, a playback of Test-case 206 may indicate that a Code Component 3 (212) may be identified as a possible source of defect 202. In this way, a correlation between defect data and one or more code components may be established using test case data. Other types of correlations between the defect data and the code components are also possible.

In one embodiment, a logging filter engine, such as logging filter engine 44 (e.g., logging filter (LF) server 220), knows of the defect code component and the user who reported the reviews. For instance, the LF server is provided, receives, determines, or otherwise obtains this information. Thus, logging filter server 220 may initiate 230 turning on/off logging on the one or more application instances for the one or more users who reported the reviews. For example, a device, such as mobile device 240, includes an application 250 instrumented with an LF-SDK, which receives communication from logging filter server 220 to turn on (or off) log filtering. (Device 240 may be remote from, but communicatively coupled to server 220 and the other components, or include the server and/or the other components.) When log filtering is turned on, one or more log events are emitted by the application that is instrumented by the LF-SDK, and are sent to a logging engine, such as logging engine 46 (e.g., log collector 260), for log collection and analysis. The log collector may be configured to review the log events and, e.g., initiate correction by, for instance, sending an alert or report to an owner of the application or a processing component to correct the error. In one example, the processing component (e.g., a processor) automatically performs a correction of the application using, e.g., heuristics, machine learning, etc. This logging continues until turned off (e.g., automatically) due to an event. The event may be, for instance, a predefined amount of time has elapsed, or a reduction of negative reviews to a selected level. Other examples are also possible.

Further details of one embodiment of dynamically controlling runtime system statistics logging are described with reference to FIG. 3. This logic may be performed by a processor, such as processor 14 running on a device, such as a mobile device, a computer or other such device. In particular, the logic may be performed by engines 40-46 (FIG. 1B) and/or one or more other components executing on processor 14 or remote therefrom. In examples, as described above, the application and the engines/components may be executing on the same device or on different devices. Many examples are possible.

Figure 3:
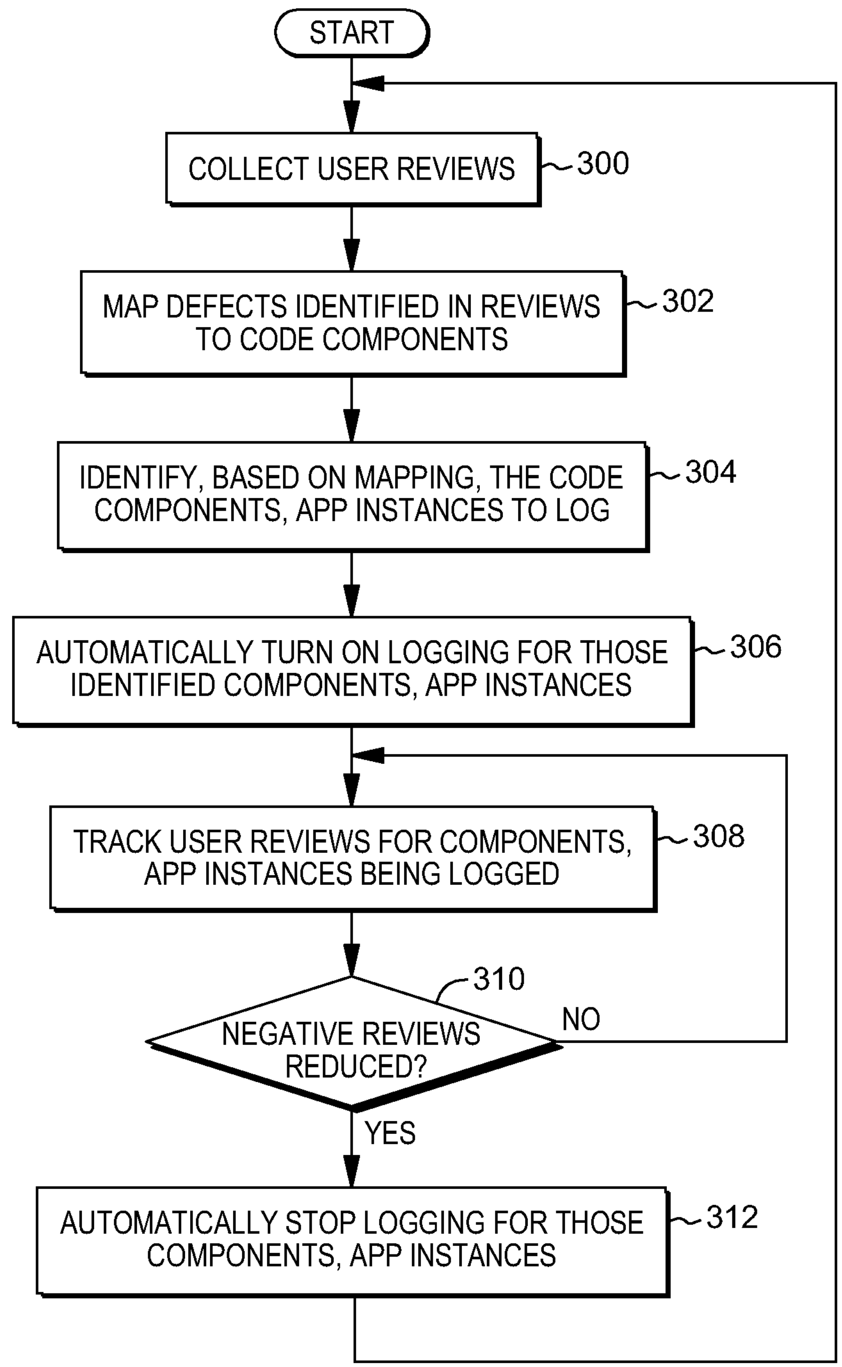
FIG. 3 depicts one embodiment of further details of automatic selective logging, in accordance with one or more aspects of the present invention.

Referring to FIG. 3, initially, user reviews are dynamically collected from one or more application stores (e.g., via user-review collection engine 40), STEP 300. Based on the user reviews, defects identified in the reviews are mapped to one or more components of one or more applications (e.g., via defect detection engine 42), as described herein, STEP 302. Based on the mapping, the code components in the application instances in which logging is to be performed are identified, STEP 304. Further, logging for those identified components in the identified application instances is automatically turned on via, for instance, logging filter-SDK 25, STEP 306. For instance, a logging filter engine (e.g., logging filter server 220) fetches an indication of code components determined to be defective in STEP 302 above. The logging filter server then identifies the users who reported the reviews in the application store which led to discovery of the defective code components. The logging filter server identifies the particular application instances of these users using their unique id. The logging filter server communicates with the logging filter-SDK on these particular application instances and initiates logging. For instance, based on communication from the logging filter server, the logging filter- SDK automatically turns on the logging capabilities for the identified code components within the identified application instances.

User reviews may then be tracked for those components, application instances being logged (e.g., via user-review collection engine 40), STEP 308. A determination is made as to whether the negative reviews have been reduced to a predetermined level, INQUIRY 310. If not, then the tracking continues, STEP 308. However, if the negative reviews have been reduced to the pre-determined level, then the logging filter server communicates again with the logging filter-SDK to stop the logging capabilities of these code components, STEP 312. This processing may be repeated, e.g., continuously, and thus, processing continues with STEP 300, in one embodiment.

In one aspect, when additional negative reviews are reported for specific features of the application, then logging automatically switches on for the code components related to those features. Further, only the application instances that were responsible for those negative reviews start logging, such that the system can capture more context specific logs for that user. As described herein, log filtering is controlled, at runtime, at code level and also at application level, based on user reviews posted in app-store reviews.

Additional details regarding one embodiment of dynamically controlling runtime system logging of an application based on end user reviews posted in an application store are described with reference to FIGS. 4A-4B. This logic may be performed by a processor, such as processor 14 running on a device, such as a mobile device, a computer or other such device. In particular, the logic may be performed by engines 40-46 (FIG. 1B) and/or one or more other components executing on processor 14 or remote therefrom. In examples, as described above, the application and the engines/components may be executing on the same device or on different devices. Many examples are possible.

Figure 4A:
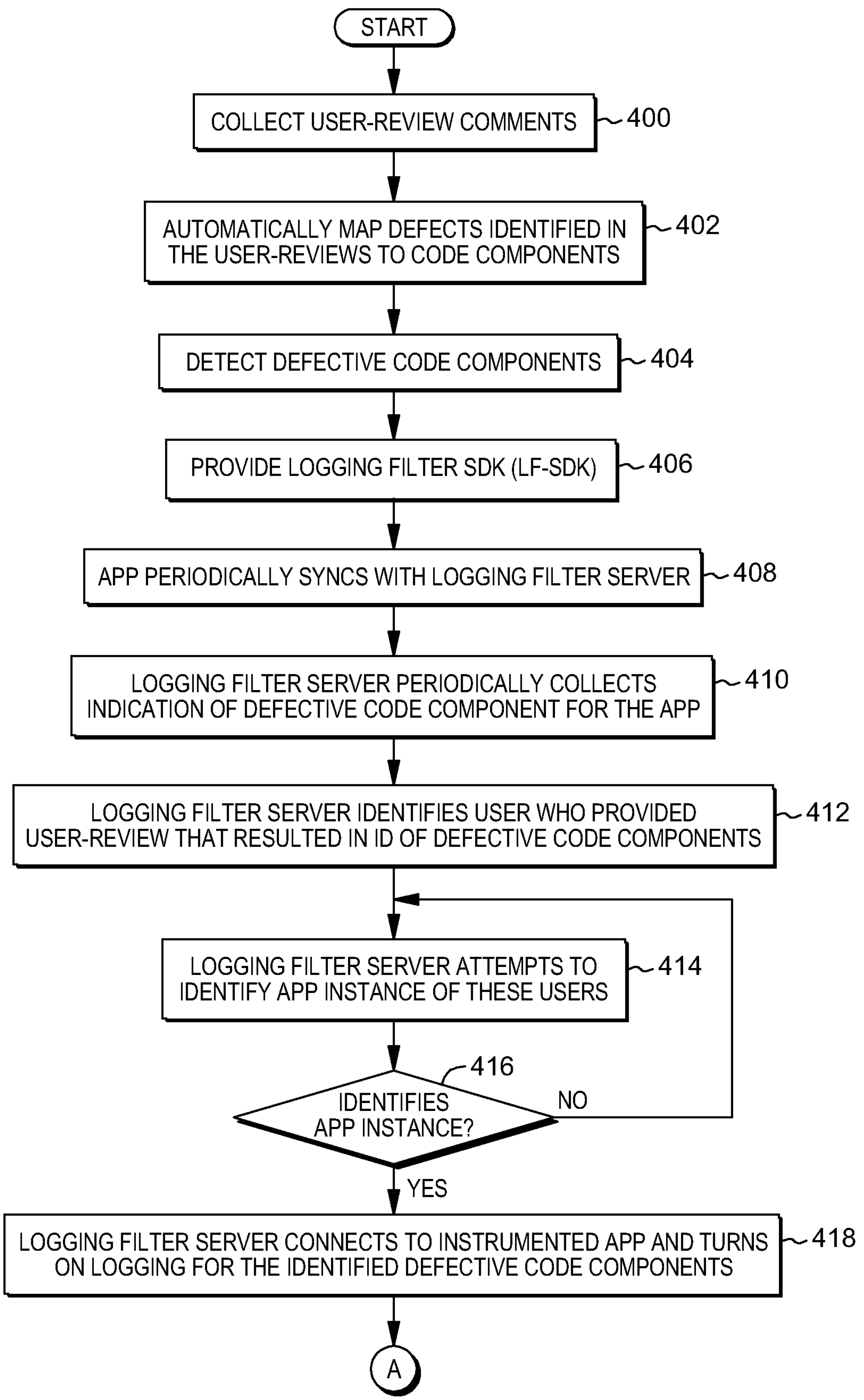
FIGS. 4A-4B depict another embodiment of further details of automatic selective logging, in accordance with one or more aspects of the present invention.

Referring to FIG. 4A, initially, user review comments are collected (e.g., via user-review collection engine 40 using, e.g., web crawling or other techniques), STEP 400. The user reviews may include textual data (e.g., written description of defects), image/video data (e.g., screenshots or other visual illustrations), rating data (e.g., assessments of the quality of the application program) and/or other types of information. For example, an application program may be a mobile software app for checking train schedules in a metropolitan area. The application program may be distributed to users via a mobile application store. Users of the application may post reviews on the mobile application store describing their experiences with the application, as well as bugs or glitches they have encountered. For instance, one user review may include a textual description that explains that the application miscalculates train fare for traveling from a first station to a second station, but displays the correct value when the origin station and the destination are reversed. The user review may also include screenshots that illustrate the miscalculated train fare.

Defects identified in the user reviews are automatically mapped to code components (e.g., via defect detection engine 42), STEP 402. For instance, test case data may be derived from, e.g., development tests of the application program. The test case data may include information regarding, for instance, archived parameter configurations in which the application was tested during development. The test case data may specify which aspects (e.g., systems, code components, modules) of the application program were tested, how they were tested, the configuration of the testing environment, the outcome of the tests, written descriptions/comments explaining how and why the application was tested, and other types of data. The test case data may indicate a set of user interface features (e.g., data objects, interface elements, other aspects) of the application program. For instance, the test case data may reference a particular screen, page, button, image, or interface element of the application program.

The development tests from which the test case data are derived may include experiments, investigations, evaluations, or other analyses performed to assess one or more aspects of the application program during development (e.g., by developers of the application program prior to public release). In embodiments, the test case data may be collected, via, for instance, searching an archived test suite (e.g., organized series of tests used to evaluate the behavior of an application program) for one or more test cases that relate to a particular defect indicated by the defect data. For instance, test case data relating to "login procedures" may be identified and collected from the test suite based on defect data that indicates a problem with the login procedure of the application program. This test case data, including one or more test cases, may be used to map the defects identified from the user reviews to one or more code components.

As a particular example, defect data may be collected which indicates a defect with respect to the "User Profile Data Submission" screen of an application program. For instance, defect data may include a written description that explains how, after entering their information, a user presses the "Save" button, but the screen simply refreshes, deleting the received data without saving it in a profile for the user. Based on the defect data, a test suite for the application program may be searched for test cases that pertain to "User Profile Data Entry," "Data Submission Procedure," and other related test cases. In embodiments, the test cases may indicate how the code components configured to implement the "User Profile Data Submission" screen were tested during development. For instance, one test case may indicate that the code components were tested for first names up to 8 characters (e.g., first names exceeding 8 characters were not tested). As such, it may be determined that the "User Profile Data Submission" screen may encounter an error when names longer than 8 characters are entered.

Based on the mapping of defects to code components, one or more specific defective code components are identified, STEP 404.

Additionally, one or more applications that include the defective code components are instrumented with logging filter-SDK, STEP 406. The instrumented applications periodically sync with a logging filter server (e.g., LF server 220 or logging filtering engine 44) to determine if logging is to be turned on/off, STEP 408.

The logging filter server periodically obtains an indication of one or more defective code components for one or more applications that is generated as part of STEP 404, STEP 410. The logging filter server also identifies the user(s) who provided the review(s) that resulted in identification of the defective code(s) in the application(s), STEP 412. The logging filter server attempts to identify the application instance(s) of the user(s) using their unique id, STEP 414. If the logging filter server identifies an application instance of these users, whose review comments resulted in identification of defective code, INQUIRY 416, then it connects to the instrumented (LF-SDK) application instance and has LF-SDK turn on the logging capability for the identified defective code components of that application instance, STEP 418. Otherwise, processing continues with STEP 414.

Figure 4B:
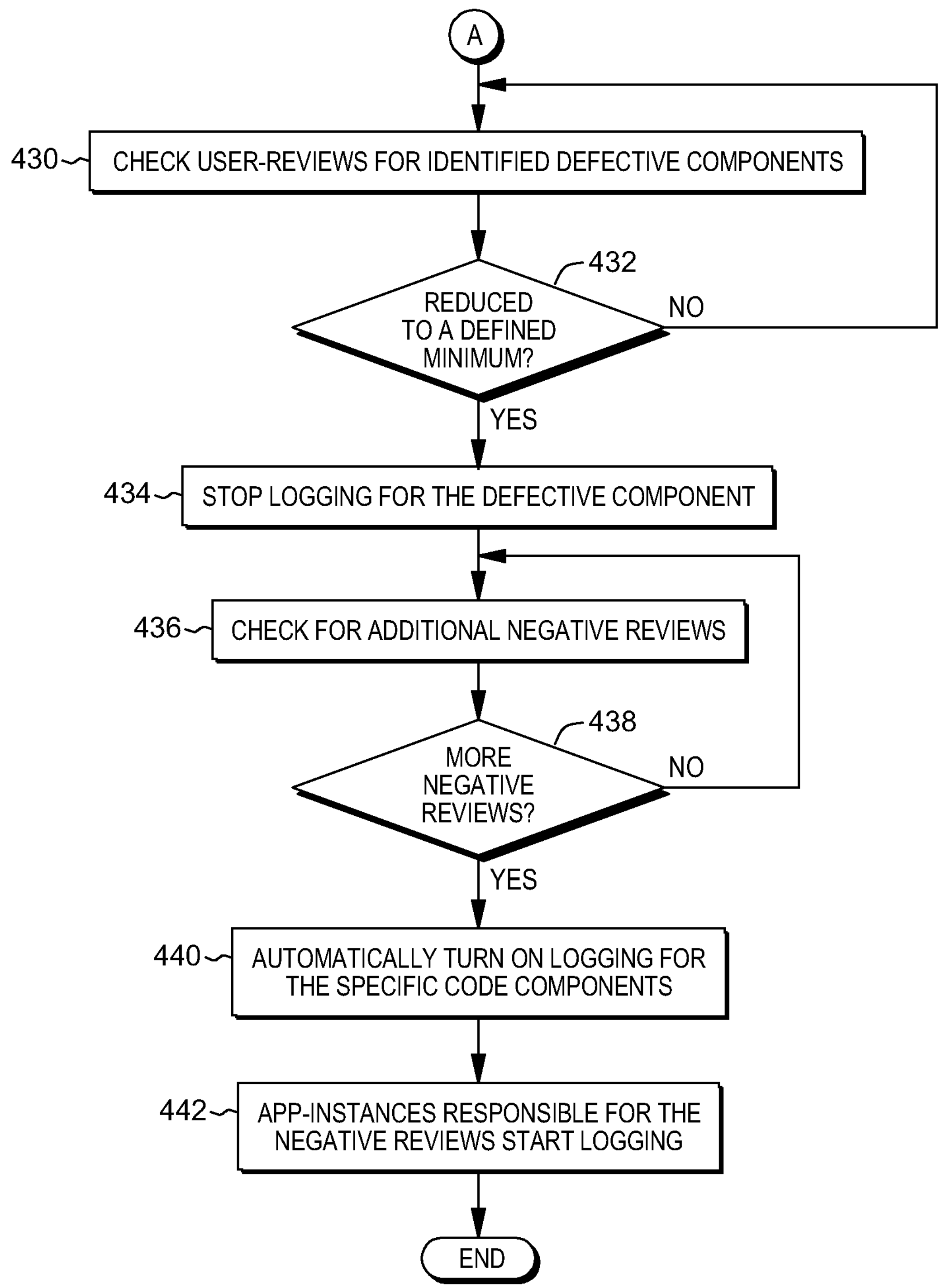

Continuing with FIG. 4B, over a period of time, these defective components may be fixed and negative reviews for these apps may be reduced. Thus, the user reviews for the identified defective components are checked, STEP 430. If the negative reviews have not been reduced to a defined minimum, then the checking continues. Otherwise, when the negative reviews are reduced to a defined minimum, the logging filter server calls the LF-SDK to stop logging for the defective component, STEP 434.

In one embodiment, the checking for additional negative reviews continues, STEP 436, and if there are more negative reviews, INQUIRY 438, then the logging for the specific code component is automatically turned on, again, STEP 440; otherwise, the checking at STEP 436 continues. Thus, only application instances who are responsible for the negative reviews start logging for particular code components of those application instances, thereby the system can capture more context specific logs for that user, STEP 442.

In one or more additional embodiments, the code components of the application program may be modified, based on the logging, to address the defects. Modifying may include adjusting, altering, repairing, fixing, revising or otherwise changing the code components. In one aspect, based on identifying one or more locations of a code component that are potentially associated with an error or defect, code components are modified to remove or resolve the error. This may result in a positive impact to application program performance and/or system performance.

As described herein, a capability is provided for automatically turning on/off logging for specific code components of specific application instances, based on user reviews received for the specific application instances. One or more aspects of the capability are inextricably tied to a technical field and/or computer technology. The applications for which logging is automatically turned on/off execute on processors of a physical device, such as a mobile device (e.g., mobile phone), a laptop computer, a desktop computer, a tablet or any other device that may execute applications. One or more aspects dynamically facilitate processing on these devices by identifying errors, logging the errors, and taking action, such as initiating correction of those errors. Initiating correction of the errors may include analyzing the log events, generating a report and sending the report to a programmer or a processing component to be used in correcting the error. In one embodiment, a processing component may automatically, via, e.g., machine learning or heuristics, correct the identified defect. Many possibilities exist.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
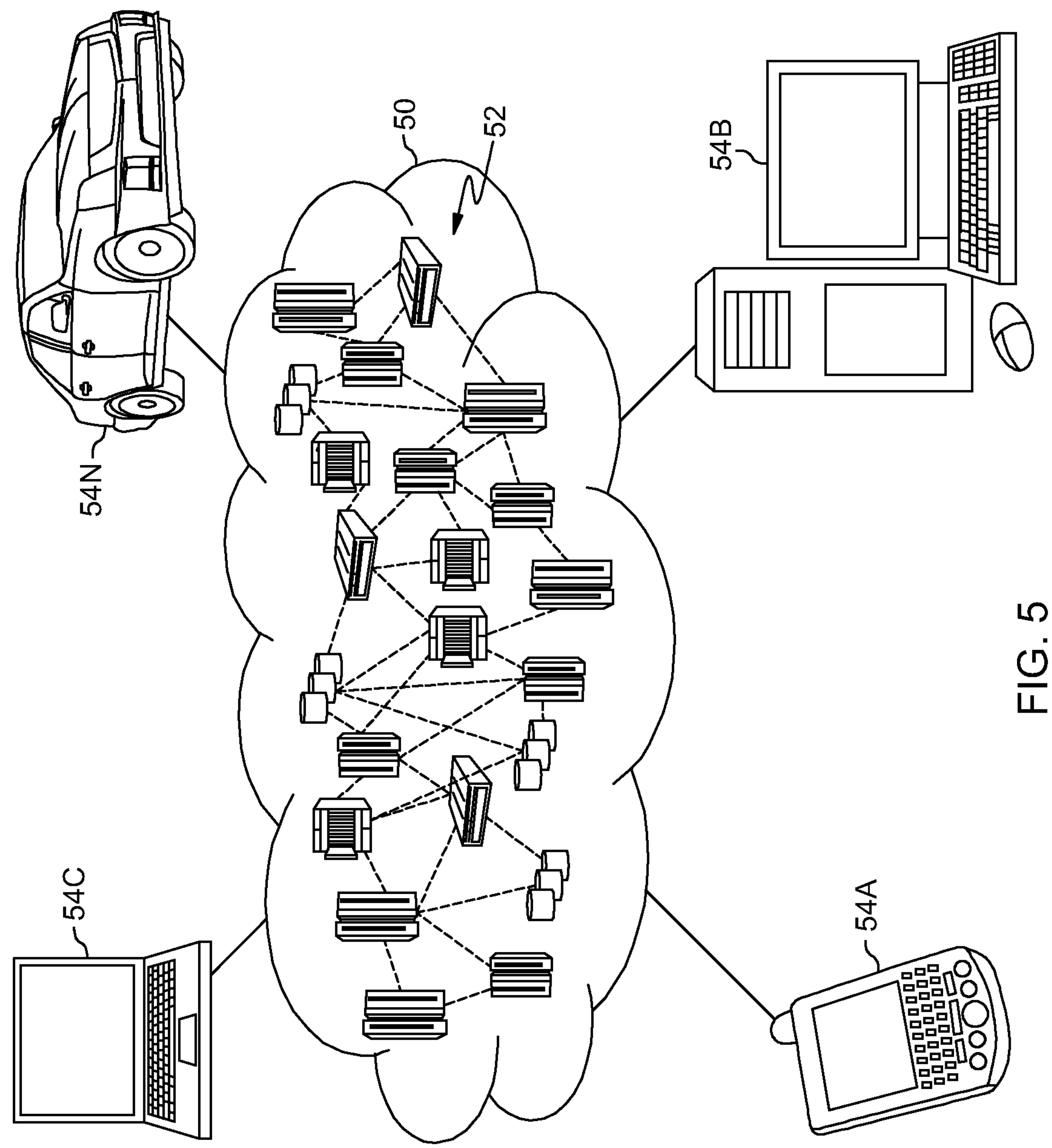
FIG. 5 depicts one embodiment of a cloud computing environment.

Referring now to FIG. 5, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 6:
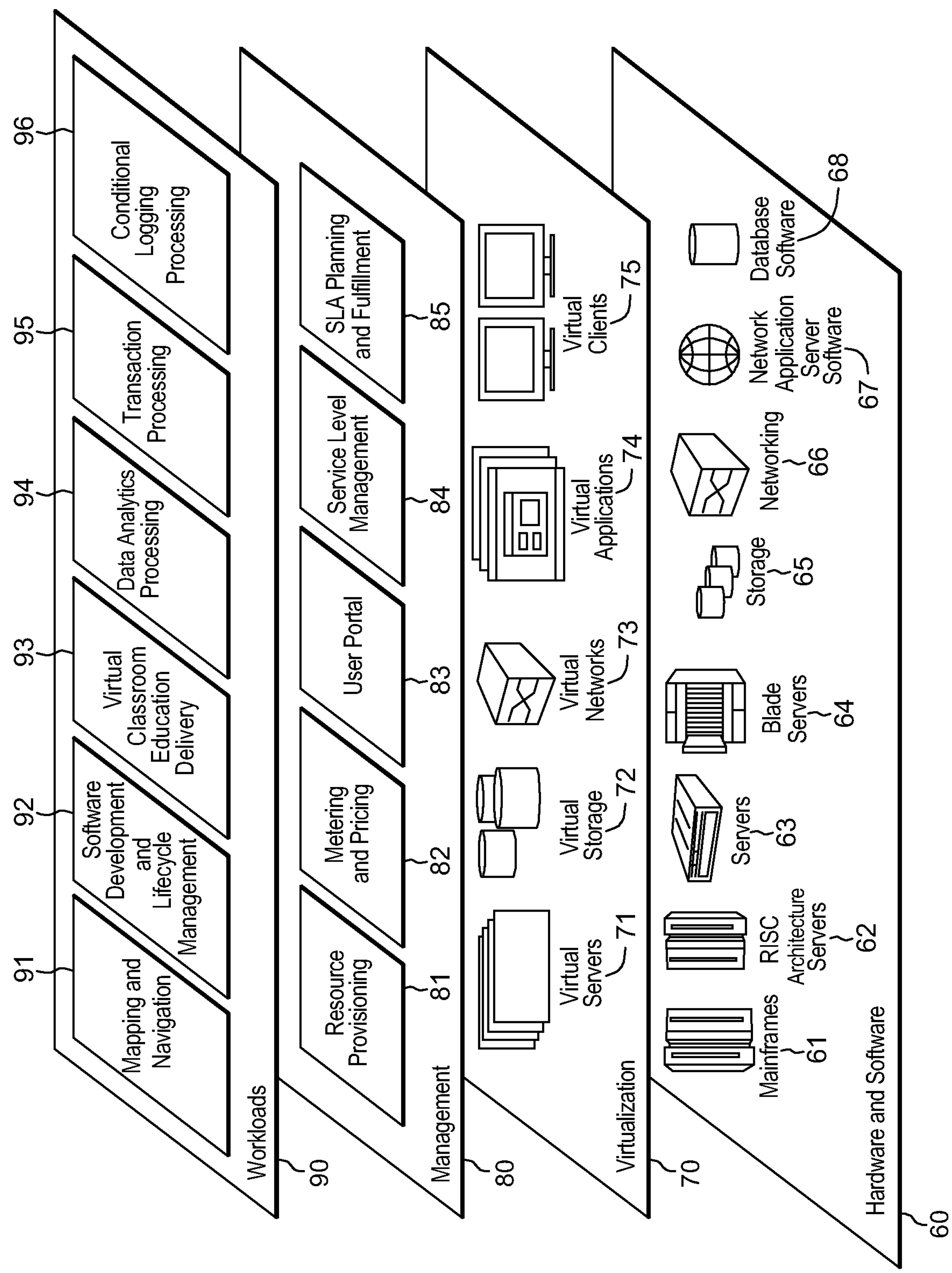
FIG. 6 depicts one example of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and conditional logging processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other computing environments may incorporate and use one or more embodiments. Further, other types of user applications and/or app-stores may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of dynamically controlling logging within a computing environment, the computer-implemented method comprising:

collecting one or more user reviews regarding an application executing on a device;

analyzing the one or more user reviews to determine whether there are one or more negative reviews regarding the application;

determining, based on the analyzing indicating that there are one or more negative reviews, one or more code components of the application having one or more defects;

automatically initiating, during runtime, logging for the one or more code components of the application determined to have the one or more defects to provide one or more logs, wherein the automatically initiating logging is selective for the one or more code components of the application in that logging is not initiated for one or more other components of the application, the automatically initiating logging includes determining a particular instance of the application to be logged, based on the one or more user reviews, and providing an indication to that particular instance of the application to begin logging, and the particular instance of the application includes a filter component, and wherein the providing the indication includes communicating with the filter component to indicate logging is to begin for the one or more code components of the particular instance of the application; and using the one or more logs to perform an action.

2. The computer-implemented method of claim 1, further comprising automatically re-initiating the determining and the automatically initiating logging, based on collecting a new negative user review.

3. The computer-implemented method of claim 1, further comprising tracking user reviews for the one or more code components, wherein the tracking is terminated based on occurrence of a selected event.

4. The computer-implemented method of claim 3, wherein the selected event comprises a reduction of the negative reviews to a selected level.

5. The computer-implemented method of claim 3, further comprising automatically repeating, subsequent to the tracking terminating, the determining and the automatically initiating logging, based on collection of a defined number of additional negative reviews that map to the one or more code components.

6. The computer-implemented method of claim 1, wherein the automatically initiating logging comprises controlling logging, at runtime, at code level and application level to provide selective logging, wherein logging is not initiated for the one or more code components in other instances of the application not being negatively reviewed.

7. The computer-implemented method of claim 1, wherein the collecting comprises obtaining the one or more user reviews from one or more application stores that provide the application.

8. The computer-implemented method of claim 1, wherein the action includes initiating correction of the application.

* * * * *